(12) United States Patent
Bacque

(10) Patent No.: US 6,912,340 B2
(45) Date of Patent: Jun. 28, 2005

(54) OPTICAL RING INTERCONNECT

(75) Inventor: James Benson Bacque, Ottawa (CA)

(73) Assignee: Tropic Networks Inc, Ottawa (CA)

(*) Notice: Subject to any disclaimer, the term of this patent is extended or adjusted under 35 U.S.C. 154(b) by 185 days.

(21) Appl. No.: 10/612,908

(22) Filed: Jul. 7, 2003

(65) Prior Publication Data

US 2004/0008931 A1 Jan. 15, 2004

Related U.S. Application Data

(63) Continuation-in-part of application No. 10/259,597, filed on Sep. 30, 2002, now Pat. No. 6,754,413, and a continuation-in-part of application No. 09/839,487, filed on Apr. 23, 2001, now abandoned.
(60) Provisional application No. 60/402,927, filed on Aug. 14, 2002.

(51) Int. Cl.[7] .............................. G02B 6/28; G02B 6/293
(52) U.S. Cl. .............................. 385/24; 385/15; 385/16; 385/39; 398/82; 398/84
(58) Field of Search ............................ 385/15, 16, 24, 385/39, 123; 398/82–84; 359/124–127, 130, 341

(56) References Cited

U.S. PATENT DOCUMENTS

| | | | | |
|---|---|---|---|---|
| 5,461,685 A | * | 10/1995 | Glance et al. | 385/24 |
| 5,680,490 A | * | 10/1997 | Cohen et al. | 385/24 |
| 2002/0012144 A1 | * | 1/2002 | Lin et al. | 359/130 |
| 2002/0071631 A1 | * | 6/2002 | Noirie et al. | 385/24 |
| 2002/0131689 A1 | * | 9/2002 | Feuer et al. | 385/24 |

OTHER PUBLICATIONS

"BMX ™Series", Preliminary Specifications, Feb. 2001, 2001 MetroPhotonics Inc., pp. 1 to 4.

* cited by examiner

Primary Examiner—Kareh C. Kianni
Assistant Examiner—Christopher M. Kalivoda
(74) Attorney, Agent, or Firm—Victoria Donnelly

(57) ABSTRACT

Optical interconnects and methods for wavelength management are provided to interconnect optical rings while overcoming color-blocking and allowing for wavelength re-use within optical rings. The optical inter-connects having a wavelength selective element such as a reconfigurable add/drop demultiplexer (ROADM) and a band-modulo demultiplexer having a free spectral range (FSR) combined with a pool of wavelength conversion resources. More flexible interconnect systems can use a photonic cross-connect (PXC) to allow sharing of a pool of wavelength conversion resources among several optical rings.

22 Claims, 11 Drawing Sheets

OPTICAL RING INTERCONNECT

RELATED APPLICATIONS

This application is a Continuation-In-Part application of, and claims the benefit of U.S. patent application Ser. No. 10/259,597 to Bacque et al., filed on Sep. 30, 2002 now U.S. Pat. No. 6,754,413, and entitled "Optical Multiplexer, Demultiplexer and Methods";

This application also is a continuation-in-part and claims the benefit of U.S. patent application Ser. No. 09/839,487 to Bacque et al, filed on Apr. 23, 2001 now abandoned, and entitled "Optical Multiplexer, Demultiplexer and Methods; and This application also claims the benefit of U.S. Provisional Application Ser. No. 60/402,927 to Bacque et al, filed on Aug. 14, 2002, and entitled "Ring Interconnect Using Reconfigurable Optical Add/Drop Multipliers".

FIELD OF THE INVENTION

The invention relates to optical network communications. More particularly, the invention relates to apparatuses for interconnecting optical fibers and optical rings carrying multi-channel optical signals.

BACKGROUND OF THE INVENTION

It is a common demultiplexing problem in optical systems to have an optical signal containing multiple wavelengths each at a different wavelength from which one or more individual channels must be extracted. The traditional solution to this problem has been to employ a wavelength specific demultiplexing device to extract the required wavelengths. Referring to FIG. 1, shown is an example of such a wavelength specific demultiplexer, generally indicated by 11. The input to the demultiplexer is a group of wavelengths having wavelength $\lambda_1, \ldots, \lambda_{64}$. In order to extract four particular wavelengths, $\lambda_A, \lambda_B, \lambda_C, \lambda_D$, the demultiplexer 11 is provided which extracts those specific wavelengths and passes them to respective receivers 12,14,16 and 18. The demultiplexer 11 is specifically designed for the particular wavelengths $\lambda_A, \lambda_B, \lambda_C, \lambda_D$ which are being extracted. Typically the demultiplexer 11 and four receivers 12,14,16 and 18 might be delivered on a card 10. In order to allow the demultiplexing of any arbitrary four wavelengths from a set of a possible 64, it would be necessary to inventory 635,376 different such cards. More realistically perhaps, given the recent propensity towards grouping wavelengths into bands of consecutive wavelengths, in order to allow the demultiplexing of any consecutive group of four wavelengths in a 64 wavelength system, for example $\{\lambda_1, \ldots, \lambda_4\}, \{\lambda_5, \ldots, \lambda_8\}, \{\lambda_{61}, \ldots, \lambda_{64}\}$ there would be a requirement to inventory 16 different demultiplexer cards.

This same problem exists on the multiplexing side, namely that a large number of wavelength specific devices must be manufactured and inventoried in order to provide multiplexing flexibility.

Optical networks are commonly deployed as interconnected optical rings carrying dense wavelength division multiplexed (DWDM) optical signals. As these rings become larger and carry more traffic, interconnection issues increase. The lowest cost method of interconnecting two optical rings is to optically couple them using optical-to-optical (OOO) coupling. Such direct coupling (OOO) of optical rings leads to systems with enormous complexity. The optical wavelength ("color") assignment is common for both rings. To overcome color blocking, wavelengths cannot be reused locally within each ring therefore link engineering becomes very complex.

Wavelength conversion is necessary to effectively deal with color blocking issues. Recently, all-optical (OOO) wavelength conversion technology has been developed but such technology is not yet cost-effective. The alternative is optical-to-electrical-to-optical (OEO) wavelength conversion. Conventional OEO wavelength converters require filtering to get wavelength-specific. To control costs, such wavelength converters often use fixed filters, with the attendant disadvantage of the many indirect costs associated with network planning, down time due to reconfigurations, inventory along the value chain and sparing. Fixed filters also have the disadvantage of increasing the variants of components in a network and this drives up inventory levels because each variant needs to be stocked individually.

SUMMARY OF THE INVENTION

It is therefore an object of the present invention to overcome the aforementioned disadvantages of the prior art. Accordingly, apparatuses are provided for improved optical interconnects and improved wavelength conversion.

In general terms, the present invention uses band-modulo demultiplexers having a free spectral range (FSR) to enable a pool of wavelength conversion resources to be used to resolve color blocking issues. This architecture extends to handle multi-ring interconnects by using photonic cross-connect which allows the wavelength conversion resources to be shared by all the rings.

More specifically, one broad aspect of the present invention provides an optical interconnect adapted to direct a first subset of an input optical signal from a first optical fiber to a second optical fiber, the input optical signal containing a plurality of wavelengths. The optical interconnect has a wavelength selective element, a band-modulo demultiplexer and a wavelength conversion resource. The wavelength selective element is adapted to act upon the input optical signal to produce an intermediate optical output signal containing the first subset of the plurality of wavelengths. The band-modulo demultiplexer has a free spectral range and is adapted to receive the intermediate optical output signal of the wavelength selective element and to provide one or more optical output signals. The wavelength conversion resource is adapted to convert the one or more optical output signals of the band-modulo demultiplexer to respective different wavelengths.

Another broad aspect of the present invention provides an optical interconnect adapted to direct a first subset of an input optical signal from a first optical fiber to a second optical fiber, the input optical signal containing a plurality of wavelengths. The optical interconnect has a wavelength selective element, a band-modulo demultiplexer, a wavelength conversion resource and an optical combiner. The wavelength selective element is adapted to act upon the input optical signal to produce an intermediate optical output signal containing the first subset of the plurality of wavelengths. The band-modulo demultiplexer has a free spectral range and is adapted to receive the intermediate optical output signal of the wavelength selective element and to provide one or more optical output signals. The wavelength conversion resource is adapted to convert the one or more optical output signals of the band-modulo demultiplexer to respective different wavelengths. The optical combiner is adapted to combine the converted optical output signals into a single optical signal on the second optical fiber.

In some embodiments, the wavelength conversion resource has one or more optical wavelength converters and each converter is adapted to convert a respective one of the one or more optical output signals to a corresponding converted optical output signal having a different wavelength.

In some embodiments, each optical wavelength converter has an optical-to-electrical-to-optical wavelength converter.

In other embodiments, each optical wavelength converter has a broadband optical receiver to receive the respective one of the one or more optical output signals and to produce a corresponding electrical signal.

In still other embodiments, each optical wavelength converter further has a tuneable narrow-band optical transmitter adapted to receive the electrical signal and to generate the corresponding converted optical output signal.

In yet other embodiments, the optical interconnect further has fully optical interconnect resources to direct a second subset of the input optical signal from the first optical fiber to the second optical fiber.

In some embodiments, the optical combiner has a band filter.

In some embodiments, the optical combiner has a band-modulo optical multiplexer.

In other embodiments, the optical combiner has an optical add/drop multiplexer.

In some embodiments, the selected subset consists of an arbitrary subset of wavelengths from the plurality of wavelengths.

In other embodiments, the arbitrary subset of wavelengths from the plurality of wavelengths is subject to a constraint that no two wavelengths in the arbitrary subset are separated by a multiple of the free spectral range.

In yet other embodiments, the wavelength selective element is adapted to select a contiguous set of wavelengths.

In some embodiments, the wavelength selective element is a bandpass filter having a passband.

In some embodiments, the wavelength selective element has a bank of components that are individually selectable and each component is adapted to select a respective contiguous set of wavelengths.

In other embodiments, each component is a bandpass filter having a passband.

In some embodiments, the first optical fiber is part of a first optical communication ring and the second optical fiber is part of a second optical communication ring.

Another broad aspect of the present invention provides an optical interconnect system having at least a first and a second optical interconnect as described wherein the first optical fiber of the first optical interconnect is the second optical fiber of the second optical interconnect and the first optical fiber of the second optical interconnect is the second optical fiber of the first optical interconnect.

Another broad aspect of the present invention provides an optical interconnect as described, wherein a photonic cross-connect is interposed between the band-modulo demultiplexer and the wavelength conversion resource and between the wavelength conversion resource and the optical combiner.

In some embodiments of the optical interconnect system, the photonic cross-connect and the wavelength conversion resource are shared among the plurality of optical interconnects.

In other embodiments of the optical interconnect system having at least a first and a second optical interconnect, the first optical fiber of the first optical interconnect is the second optical fiber of the second optical interconnect and the first optical fiber of the second optical interconnect is the second optical fiber of the first optical interconnect.

Another broad aspect of the present invention provides a method of wavelength management in an optical network. The method comprises steps of providing an optical interconnect, determining desired input wavelengths to be directed from the first optical fiber to the second optical fiber, controlling the wavelength selective element to select the desired input wavelengths, determining desired respective different output wavelengths to which to convert the desired input wavelengths and controlling the wavelength conversion resource to output the desired respective different wavelengths. The optical interconnect is adapted to direct a first subset of an input optical signal from a first optical fiber to a second optical fiber, the input optical signal containing a plurality of wavelengths. The optical interconnect has a wavelength selective element, a band-modulo demultiplexer, a wavelength conversion resource and an optical combiner. The wavelength selective element is adapted to act upon the input optical signal to produce an intermediate optical output signal containing the first subset of the plurality of wavelengths. The band-modulo demultiplexer has a free spectral range and is adapted to receive the intermediate optical output signal of the wavelength selective element and to provide one or more optical output signals. The wavelength conversion resource is adapted to convert the one or more optical output signals of the band-modulo demultiplexer to respective different wavelengths. The optical combiner is adapted to combine the converted optical output signals into a single optical signal on the second optical fiber.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
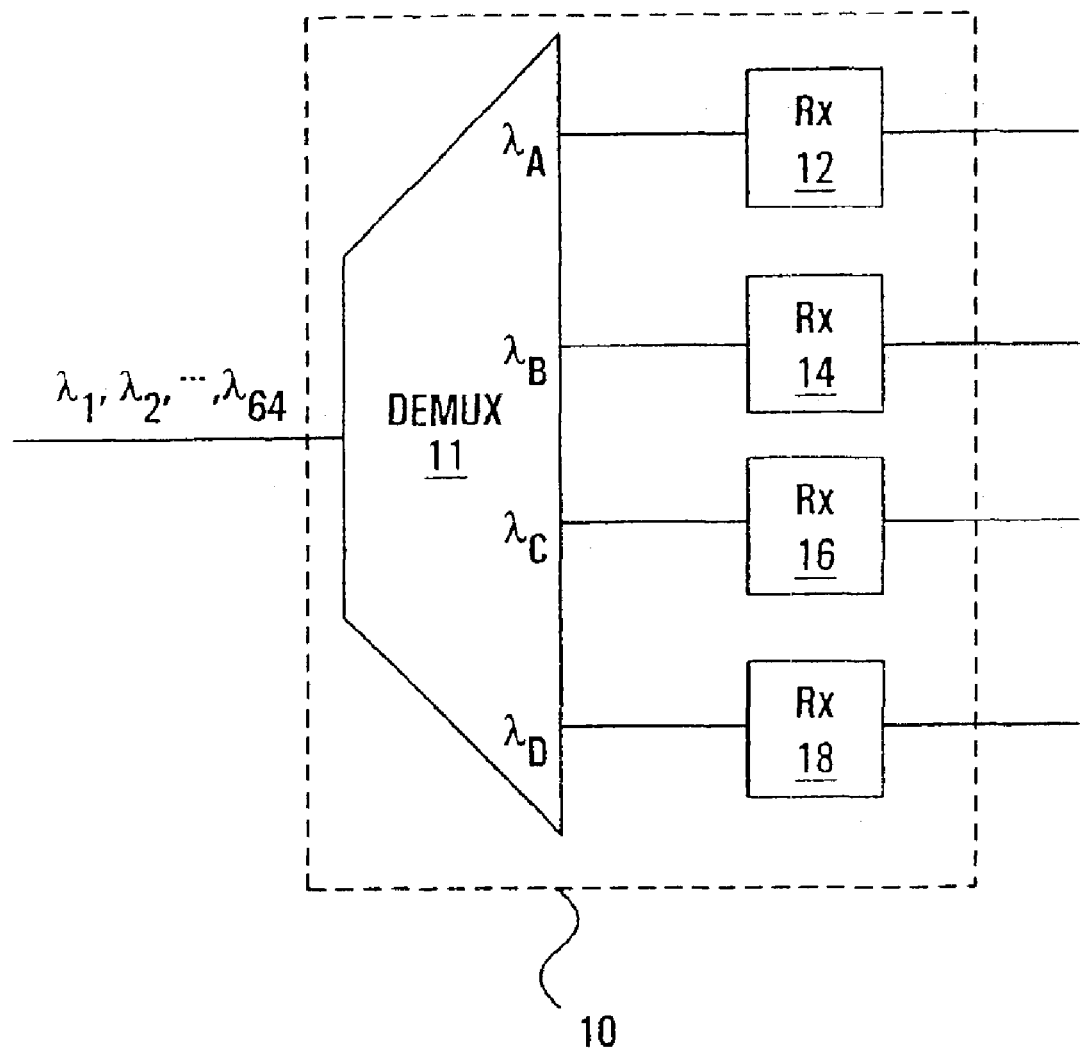
FIG. 1 is a block diagram of a conventional multi-wavelength demultiplexer.
Figure 2:
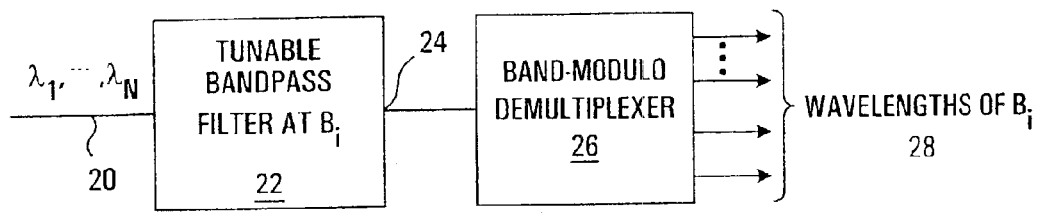
FIG. 2 is a block diagram of an optical demultiplexer provided by an embodiment of an aspect of the invention.

Referring now to FIG. 2, shown is a block diagram of a demultiplexer according to an embodiment of an aspect of the invention. The demultiplexer has an input optical transmission medium 20 adapted to contain a multi-band optical signal containing multiple wavelengths, $\lambda_1, \ldots, \lambda_N$. For example, there might be N=64 different wavelengths. The input optical transmission medium is connected to a tuneable bandpass filter 22, the output 24 of which is connected to a band-modulo demultiplexer 26.

The input wavelengths $\lambda_1, \ldots, \lambda_N$ are logically divided into K bands $B_1, \ldots, B_K$ each containing M=N/K consecutive wavelengths of the input wavelengths $\lambda_1, \ldots, \lambda_N$. For example, for the N=64 wavelength embodiment, M might be four in which case there are K=64/4=16 bands of wavelengths, the first of which is $B_1=\lambda_1, \ldots \lambda_4$, the second of which is $B_2=\lambda_5, \ldots \lambda_8$, and the last of which is $B_{16}=\lambda_{61}, \ldots \lambda_{64}$. The tuneable bandpass filter 22 has a passband equal in width to the bands of wavelengths, and is tuneable such that it can be centered to have a passband which overlaps with any particular one of the K bands $B_1$, ... $B_K$. Thus the output 24 of the tuneable band pass filter 22, once tuned, consists of the wavelengths in a selected band $B_i$ only. This output is connected to the band-modulo demultiplexer 26 which separates the wavelengths of the band $B_i$ selected by the tuneable bandpass filter 22 into outputs 28 which are individual substituent wavelengths of the band $B_i$.

Figure 3:
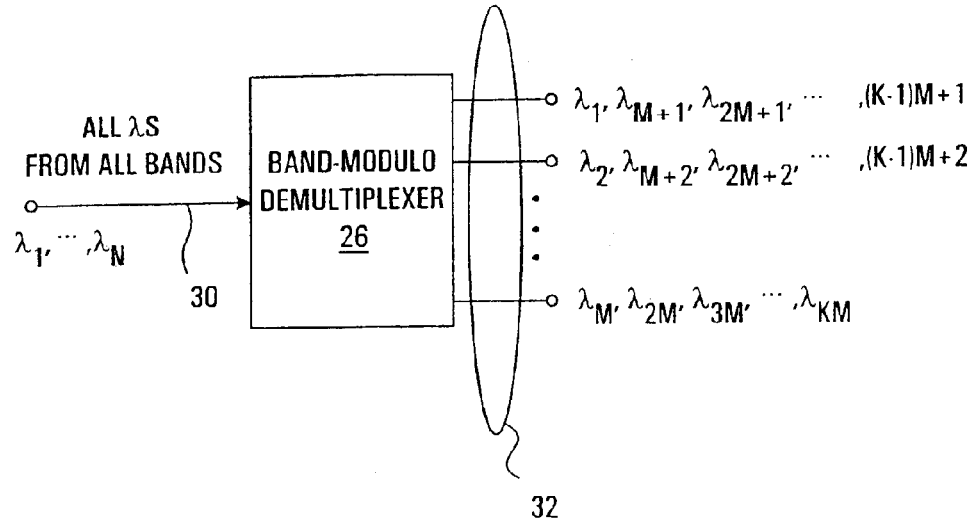
FIG. 3 is a schematic diagram of the band-modulo demultiplexer of FIG. 2.

The band-modulo demultiplexer 26 is a device which takes as input a spectrum of wavelengths, preferably with constant channel spacing in frequency, and outputs to more than two ports such that each port outputs a different group of wavelengths that are separated by the FSR (free spectral range) of the device. The free spectral range of the device is the range of wavelengths in a given spectral order for which superposition of light from adjacent orders does not occur. Referring now to FIG. 3 which shows the behaviour of the band-modulo demultiplexer 26 in isolation, the band-modulo demultiplexer 26 has a single input 30 (received from output 24 when connected to filter 22), and has a number of outputs 32 (analogous to outputs 28 when the filter 22 is present) equal to the number M of wavelengths in each band. In the example described above, M is set equal to four. The band-modulo demultiplexer 26 performs a demultiplexing function of wavelengths modulo M=number of wavelengths in a band. The band-modulo demultiplexer 26 does not perform a demultiplexing function down to the individual wavelength, but rather outputs groups of wavelengths separated by M wavelengths (this being the FSR of the device). Assuming all possible N input wavelengths are input to the band-modulo demultiplexer, the outputs of the band-modulo demultiplexer may be summarized as follows:

Output 1=$\lambda_1, \lambda_{M+1}, \lambda_{2M+1}, \ldots, \lambda_{(K-1)M+1}$.

Output 2=$\lambda_2, \lambda_{M+2}, \lambda_{2M+2}, \ldots, \lambda_{(K-1)M+2}$.

Output 3=$\lambda_3, \lambda_{M+3}, \lambda_{2M+3}, \ldots, \lambda_{(K-1)M+3}$.

...

Output M=$\lambda M, \lambda_{2M}, \lambda_{3M}, \ldots, \lambda_{KM}$.

In embodiments in which bands are employed, preferably the FSR is set to equal the frequency spacing between corresponding wavelengths in each band. Using the above notation, the FSR will be set to equal the frequency of $\lambda_{M+1}$ minus the frequency of $\lambda_1$ for example. In one embodiment, each of the N wavelengths are equally spaced in frequency.

In another embodiment, the bands each contain M equally spaced frequencies, but a guard band is provided between bands.

In another embodiment, the bands each contain M frequencies which are not equally spaced, but with the spacing of the frequencies within a given band being equal across bands. Guard bands can also be employed in this embodiment.

Referring now again to FIG. 2, the tuneable band pass filter 22, once tuned, serves to eliminate all of the wavelengths being input to the band-modulo demultiplexer 26 except the M wavelengths of a single band $B_i$. The band-modulo demultiplexer 26 performs its modulo demultiplexing function on the wavelengths of the single band. Since no two of the input wavelengths are separated by more than the FSR of the demultiplexer 26, each output of the band-modulo demultiplexer 26 contains only a single wavelength of the selected band $B_i$. For example, if the tuneable band pass filter 22 is tuned to allow $B_2=\lambda_{M+1}, \lambda_{M+2}, \ldots, \lambda_{2M}$ to be input to the band-modulo demultiplexer 26, the band-modulo demultiplexer 26 separates each of these wavelengths into a separate respective output 28.

Advantageously, the arrangement of FIG. 2 can be mass-produced, and tuning the arrangement to produce a demultiplexer function specific to a particular band $B_i$ simply involves tuning the tuneable band pass filter 22 to pass the particular band.

Figure 4:
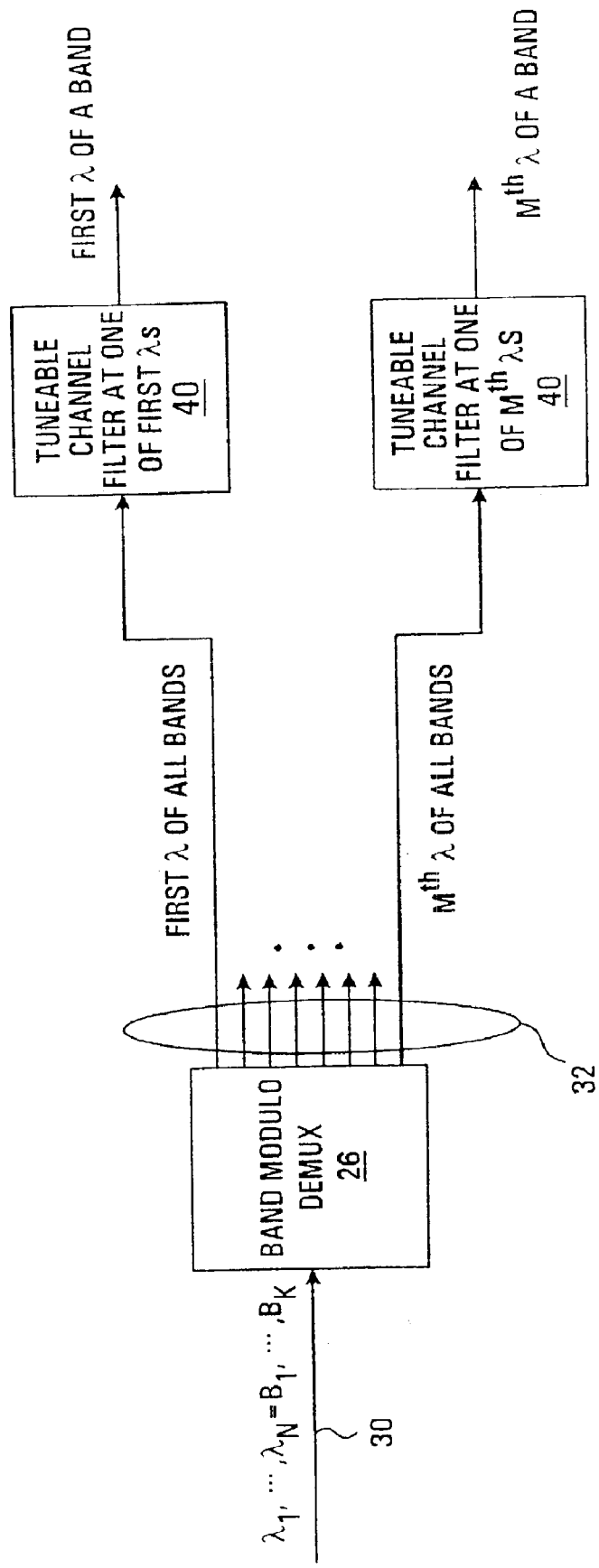
FIG. 4 is a block diagram of an optical demultiplexer according to another embodiment of an aspect of the invention.

Referring now to FIG. 4, in another embodiment of an aspect of the invention, the band-modulo demultiplexer 26 of FIG. 3 is connected to receive an input optical signal 30 containing the wavelengths $\lambda_1, \ldots, \lambda_N$ so as to produce M outputs containing multiple wavelengths as described above. Each output is connected to a respective tuneable channel filter 40 (only two shown) which is tuneable to pass one or more of the multiple wavelengths it receives. For example, the first of the outputs 32 contains the "first" wavelength of each band $B_1, \ldots B_K$. The tuneable channel filter 40 receiving that output can be tuned to extract any particular first wavelength. This allows the flexibility of choosing at each output any one of the respective group of wavelengths output by the band modulo demultiplexer. Advantageously, since the wavelengths input to each tuneable channel filter 40 are separated by at least the FSR of the band-modulo demultiplexer 26, the design constraints/tolerances of the filter 40 are very relaxed.

The above designs can be applied to any set of wavelengths of interest. In one example, the input set of wavelengths $\{\lambda_1, \ldots, \lambda_N\}$ is in the lower C band (194.15 to 196.1 THz) with 50 GHz spacing between wavelength frequencies, with the longest and shortest wavelengths in a given band $B_i$ differing in frequency by 350 GHz. This results in 5 bands $B_i$ each containing 8 wavelengths for a total of 40 wavelengths. In this example, N=40, M=8, and K=5.

In another example, the input set of wavelengths $\{\lambda_1, \ldots, \lambda_N\}$ is in the upper C band (192.1 to 194.1 THz) with 50 GHz spacing between wavelength frequencies, with the longest and shortest wavelengths in a given band $B_i$ differing in frequency by 400 GHz. This results in 5 bands $B_i$ each containing 8 wavelengths for a total of 40 wavelengths. In this example, N=40, M=8 and K=5.

The band-modulo demultiplexer 26 may be implemented using any suitable "FSR device", this being any optical element or combination of elements which exhibit the required FSR. For example, in one embodiment, the band-modulo demultiplexer is a grating based structure, and preferably an Echelle grating based structure. Echelle gratings are available for example from Metro Photonics Inc. of Ottawa, Canada. Conventionally, the FSR has been thought of as a limitation of the usefulness of Eshelle gratings. By designing an Echelle grating having a free spectral range equal to the wavelength separation of wavelengths output by a given channel, the required band-modulo demultiplexing function is achieved. Preferably, the FSR is substantially equal to the bandpass width of the tuneable bandpass filter. In another embodiment, the FSR is smaller than the bandpass width of the tuneable bandpass filter in which case each output may have more than one wavelength. For example, having the FSR equal to one half the bandpass width of the tuneable bandpass filter will result in each output of the arrangement containing two wavelengths separated by the FSR.

In another embodiment, the FSR is broader than the passband width of the tuneable bandpass filter. This will result in gaps in the set of wavelengths which are demultiplexing by the arrangement. This can be employed to provide a guard band of one or more wavelengths between bands of interest.

Figure 5:
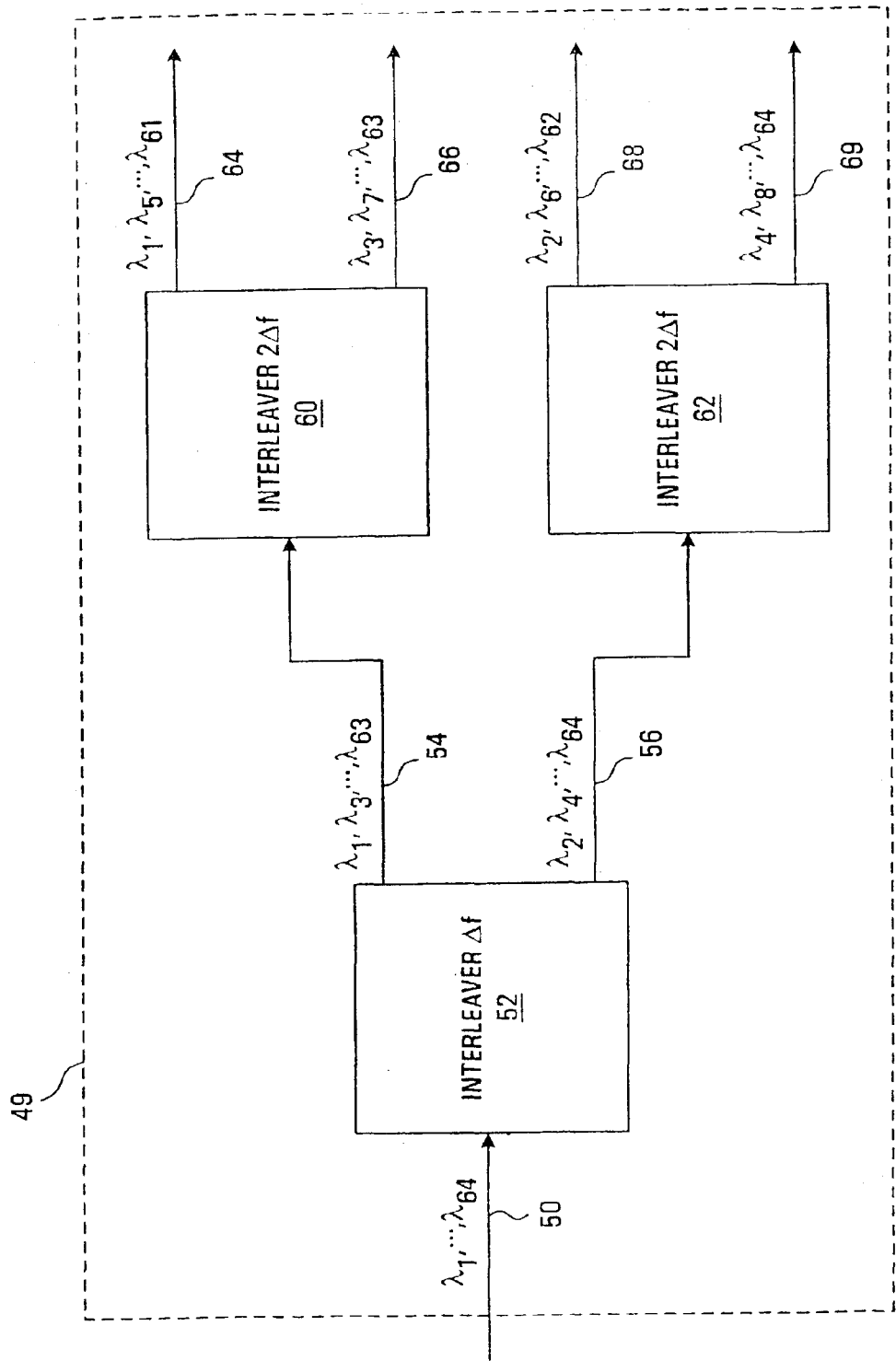
FIG. 5 is a schematic diagram of an interleaver based band-modulo demultiplexer provided by another embodiment of an aspect of the invention.

In another embodiment, the band-modulo demultiplexer 26 of FIGS. 2 and 3 is an interleaver-based structure. Referring to FIG. 5, an interleaver-based design for the case N=64 (64 wavelengths in total), K=16 (sixteen bands), and M=4 (four wavelengths in each band) is generally indicated by 49. The input optical signal potentially having any of 64 possible wavelengths $\{\lambda_1, \ldots, \lambda_{64}\}$ is fed to a first interleaver 52 which separates the wavelengths into an output 54 carrying the odd wavelengths $\{\lambda_1, \lambda_3, \ldots, \lambda_{63}\}$ and an output 56 carrying the even wavelengths $\{\lambda_2, \lambda_4, \ldots, \lambda_{64}\}$. The two outputs 54,56 are connected to respective interleavers 60, 62. Interleaver 60 further interleaves the odd wavelengths to produce output 64 carrying $\{\lambda_1, \lambda_5, \ldots, \lambda_{61}\}$ and output 66 carrying $\{\lambda_3, \lambda_7, \ldots, \lambda_{63}\}$. Similarly, interleaver 62 further interleaves the even wavelengths to produce output 68 carrying $\{\lambda_2, \lambda_6, \ldots, \lambda_{62}\}$ and output 69 carrying $\{\lambda_4, \lambda_8, \ldots, \lambda_{64}\}$. The overall interleaver based structure 49 is a band-modulo demultiplexer having an FSR of four times the wavelength frequency separation. A specific interleaver based example has been presented for particular values of N,K,M. However, it is to be understood that a suitable interleaver based structure could be developed for arbitrary values of N,K,M. The interleaver-based FSER device of FIG. 5 in combination with the preceding tuneable filter (as discussed previously with reference to FIG. 2) or in combination with following tuneable filters (as discussed previously with reference to FIG. 4) provide the tuneable demultiplexer functionality.

Figure 6:
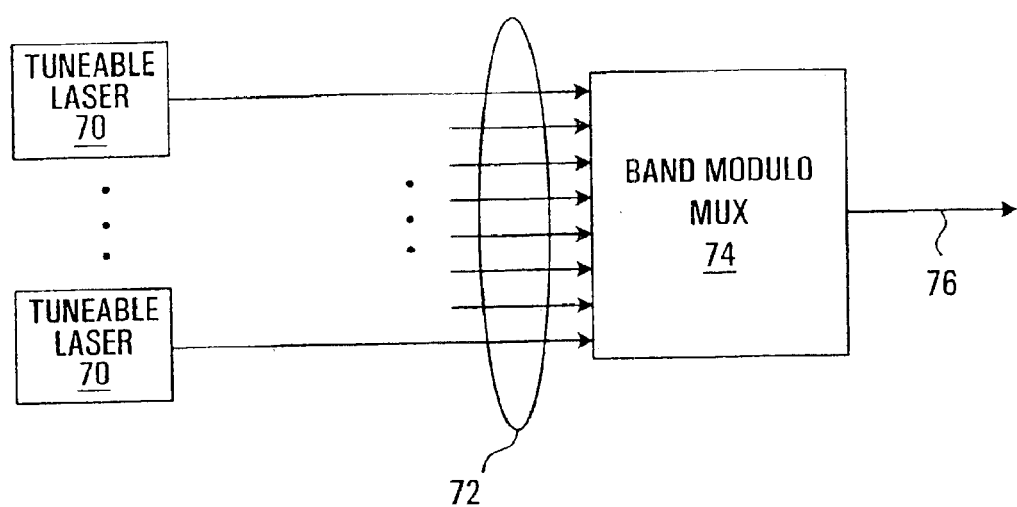
FIG. 6 is a schematic diagram of an optical multiplexer provided by another embodiment of an aspect of the invention.

Referring now to FIG. 6, shown is a block diagram of an optical multiplexer according to an embodiment of an aspect of the invention. The multiplexer has a band-modulo multiplexer 74 which is essentially the reciprocal function of the previously discussed band-modulo demultiplexer. The band-modulo multiplexer 74 takes a group of wavelengths that are separated from each other by the free spectral range into more than two ports 72 such that each port intakes a different group of wavelengths. More specifically, the inputs are capable of multiplexing the following wavelengths:

Input 1=any combination of $\lambda_1, \lambda_{M+1}, \lambda_{2M+1}, \ldots, \lambda_{(K-1)M+1}$.

Input 2=any combination of $\lambda_2, \lambda_{M+2}, \lambda_{2M+2}, \ldots, \lambda_{(K-1)M+2}$.

Input 3=any combination of $\lambda_3, \lambda_{M+3}, \lambda_{2M+3}, \ldots, \lambda_{(K-1)M+3}$.

. . .

Input M=any combination of $\lambda_M, \lambda_{2M}, \lambda_{3M}, \ldots, \lambda_{KM}$.

Wavelengths input to the wrong port are attenuated and lost.

The band-modulo multiplexer 74 outputs at output 76 all the input wavelengths in wavelength order. A tuneable laser 70 may be applied to any one of the input ports 72 with one of the multiple wavelengths available at the port. For example, on the second input port, one can transmit the second wavelength for any of one of the supported bands. The output of the wavelengths produced at output 76 may not all fall in the same band depending on the input wavelengths.

Another embodiment provides an optical wavelength multiplexer adapted to perform wavelength multiplexing of a plurality of input optical signals each containing a plurality of wavelengths. The multiplexer has a band-modulo multiplexer having a free spectral range, the band-modulo multiplexer having a plurality of inputs with one input for each of the plurality of input optical signals, the band-modulo multiplexer producing a multiplexed output signal, the band-modulo multiplexer being adapted to combine as the multiplexed output signal for each input any input optical wavelengths in a respective predetermined set of possible wavelengths, each possible wavelength in the set being separated by the free spectral range.

Another embodiment of an aspect of the invention provides an optical network node per se equipped with either the above described optical multiplexer, the above described optical demultiplexer, or both. Such an optical network node is flexible in that the particular wavelengths to be added and/or dropped by the node can be selected by appropriate tuning of either the multiplexer and/or the demultiplexer.

Figure 7:
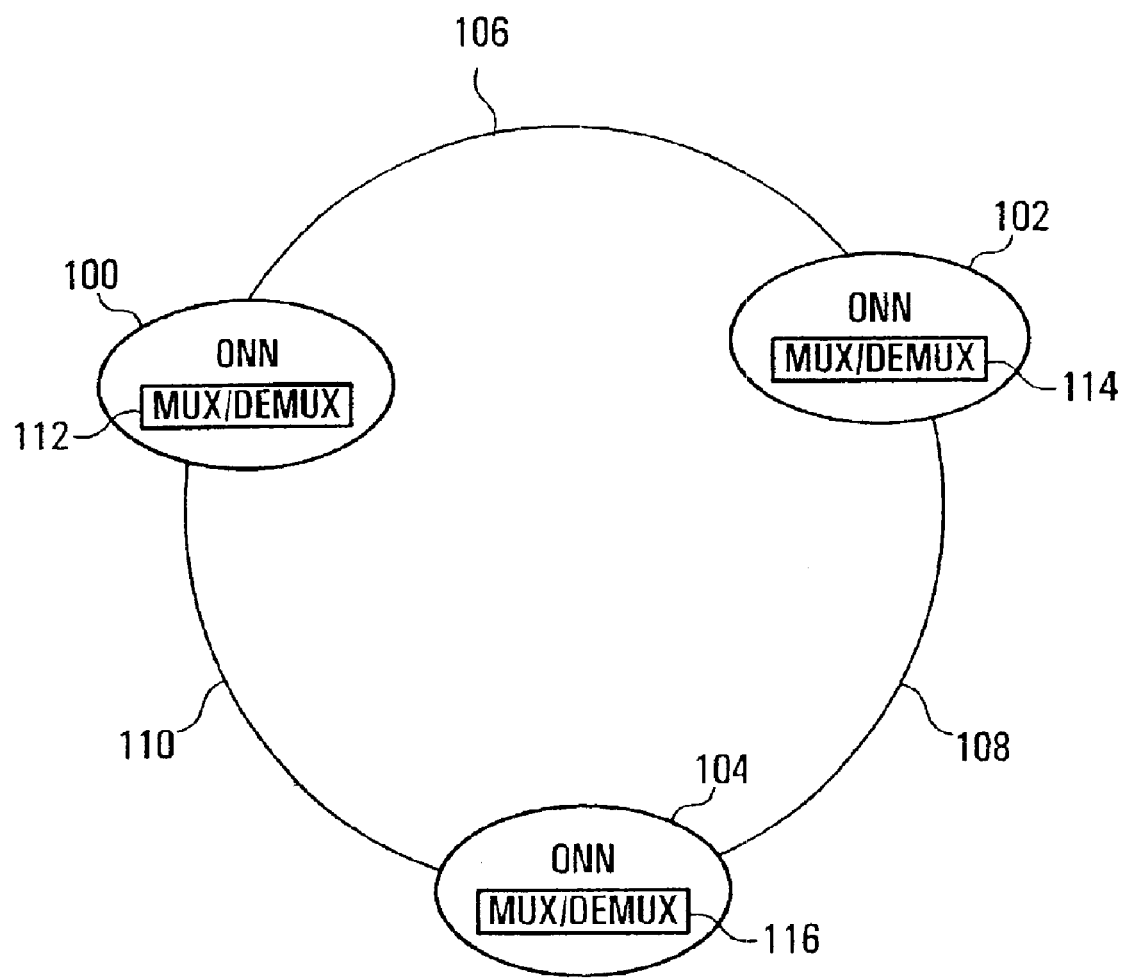
FIG. 7 is a schematic diagram of an optical network provided by another embodiment of an aspect of the invention.

Another embodiment of an aspect of the invention provides an optical network in which at least some of the optical network nodes are equipped with either the above described optical multiplexer, the above described optical demultiplexer, or both. Referring now to FIG. 7, shown is an example network provided by this embodiment of an aspect of the invention which a number of ONNs (optical network nodes) 100,102,104 (only three shown) interconnected by optical network links 106,108,110. One or both of the previously described optical multiplexer and optical demultiplexer is installed in each of the optical network nodes 100,102,104, generally indicated as multiplexer/demultiplexer (mux/demux) 112,114,116. Such an optical network is flexible in that the particular wavelengths to be added and/or dropped by each node can be selected by appropriate tuning of either the multiplexer and/or the demultiplexer.

Figure 8:
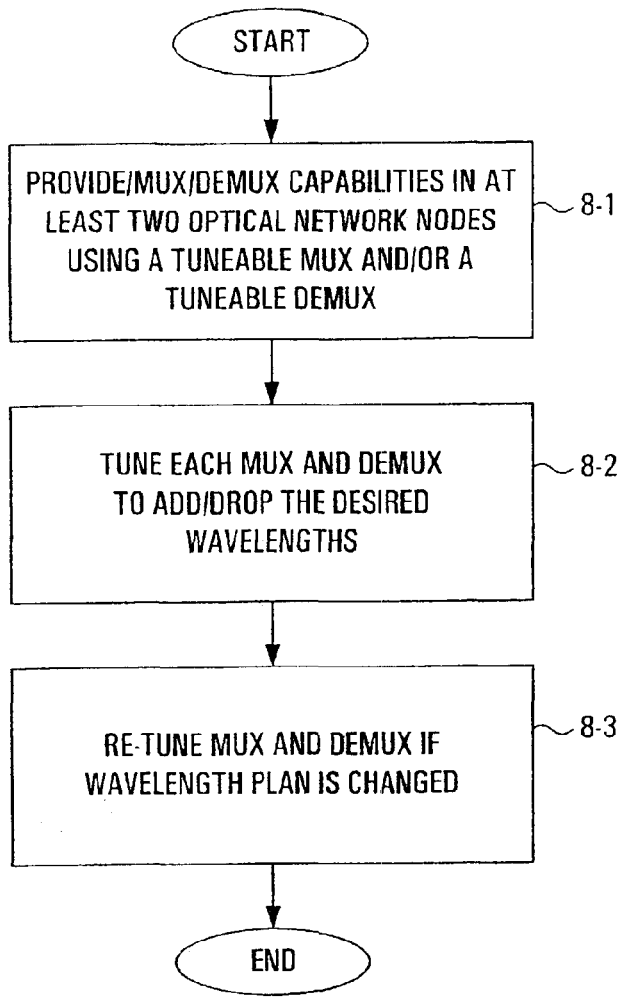
FIG. 8 is a flowchart of a method of wavelength planning, provided by another embodiment of an aspect of the invention.

Yet another embodiment of an aspect of the invention provides a method of wavelength management. Referring now to FIG. 8, the method involves first providing each of at least two optical network nodes with either or both of the above described multiplexer and demultiplexer capability using a tuneable multiplexer, and/or a tuneable demultiplexer (step 8-1). Preferably, this is done in each of the optical network nodes in an optical network. Next, after determining desired wavelengths to be added and/or dropped at each of the optical network nodes, each the filters in each multiplexer and/or demultiplexer are tuned so that the desired wavelengths are added and/or dropped at each optical network node (step 8-2). The step of tuning the multiplexer and/or demultiplexer may be done prior to network interconnection, or after network interconnection, and advantageously may be optionally repeated when the wavelength plan for the network is changed for any reason (step 8-3).

In the above described embodiments, a demultiplexer is provided which has a wavelength selective element, such as a tuneable filter, which is adapted to filter the input optical signal to produce an output containing a selected subset of the plurality of wavelengths. In some embodiments, the selected subset is one of a number of contiguous bands of wavelengths as exemplified above.

In another embodiment, the wavelength selective element is adapted to produce a selected subset which is a completely arbitrary set. However, in this case preferably the selected subset does not include any wavelengths separated by multiples of the FSR of the FSR device as this would result in collision. In a four band system for example, the first wavelength of the first band, the second wavelength of the third band, the fourth wavelength of the third band, and the third wavelength of a fourth band could be filtered and demultiplexed successfully without collision.

In another embodiment, the wavelength selective element is implemented with a bank of wavelength selective components, such as bandpass filters for example, each passing a respective band, and a switch to select between the components.

Most generally, any wavelength selective element may be employed to extract certain wavelengths from the optical signal. For example, a fixed wavelength selective element may be employed which passes only a pre-determined band.

Figure 9:
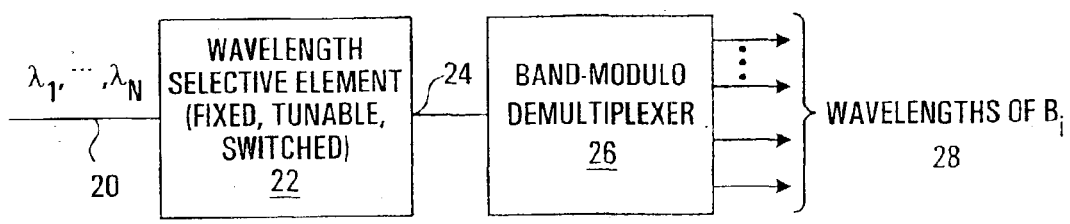
FIG. 9 is a block diagram of an optical demultiplexer provided by an embodiment of an aspect of the invention.
Figure 10:
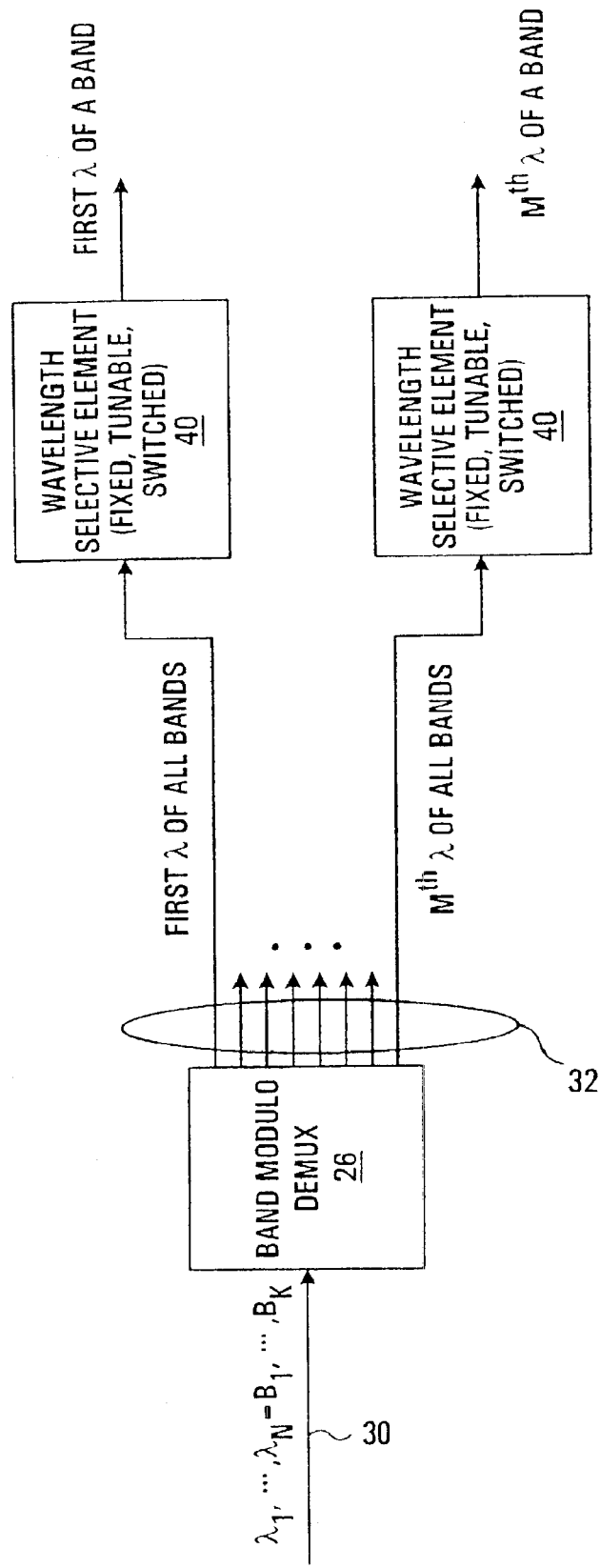
FIG. 10 is a block diagram of an optical demultiplexer according to another embodiment of an aspect of the invention.

FIGS. 9 and 10 are versions of FIGS. 2 and 4 respectively in which these generalized wavelength selective elements are specifically shown.

Figure 11:
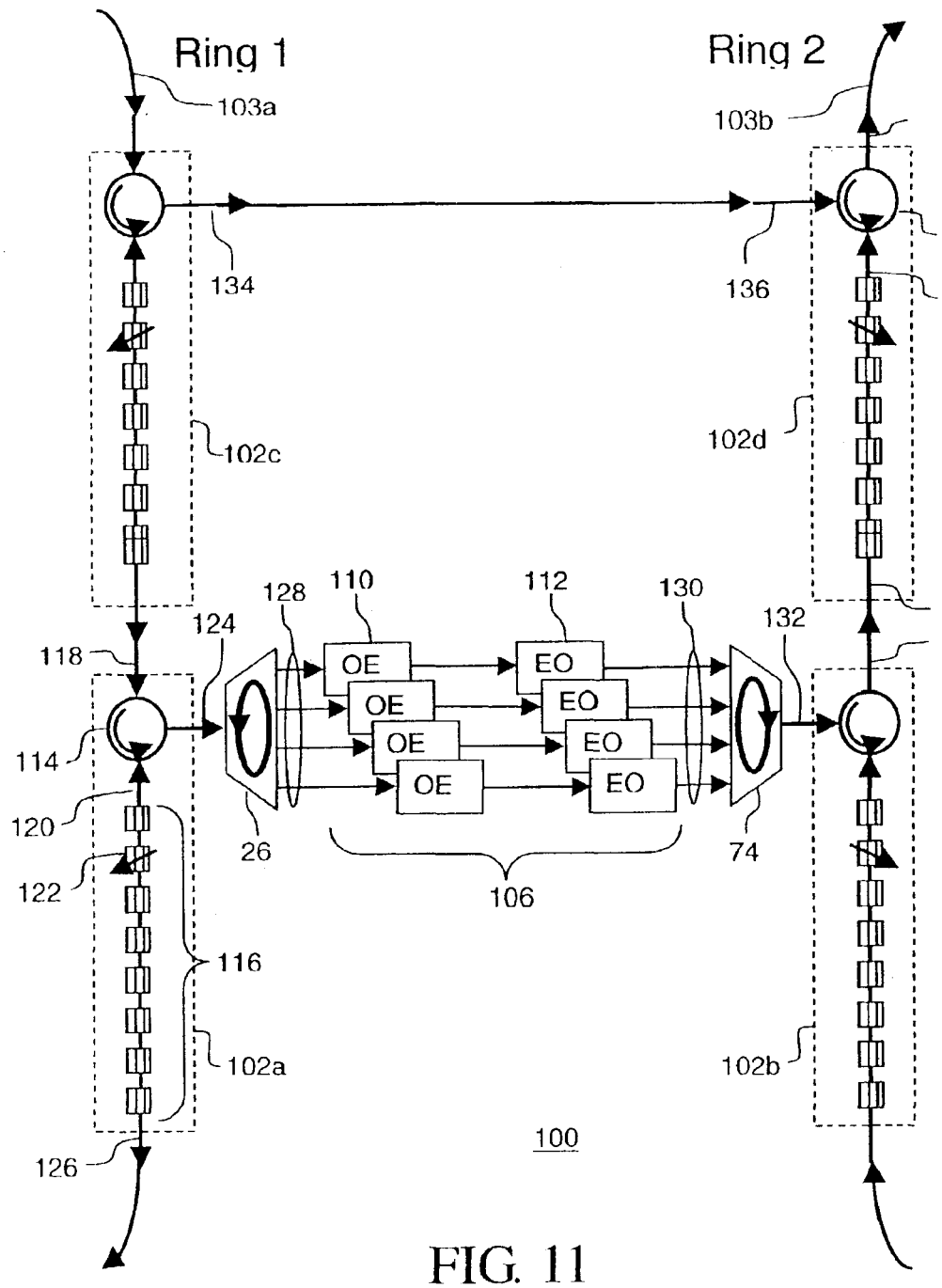
FIG. 11 is a block diagram of an optical interconnect according to an embodiment of the invention.

In an embodiment of the present invention, the previously described demultiplexer is used in conjunction with a pool of wavelength conversion resources to provide wavelength conversion capabilities, connecting signals from a first fiber ring to a second fiber ring. Referring now to FIG. 11, shown is a block diagram of an optical interconnect (generally indicated by 100) according to an embodiment of the present invention. A wavelength selective element in the form of a re-configurable optical add/drop multiplexer (ROADM) 102a receives an input optical signal from a first optical fiber 103a of "Ring 1". The optical signal carries a plurality of wavelengths such as, for example, dense wavelength division multiplexed (DWDM) optical communications traffic. The ROADM 102a presents a subset of the wavelengths of the optical input signal to a band-modulo demultiplexer 26. The band-modulo demultiplexer 26 has a plurality of outputs 128 presenting selected optical signals to a pool of wavelength conversion resources 106 which can translate each of the individual optical signals from one wavelength to a different wavelength. The translated signals are combined by multiplexer 74 and inserted into the fiber of optical ring "Ring 2" 103b via ROADM 102b. It is noted that ROADM 102a can correspond to the tuneable band-pass filter/wavelength selective device 22 of FIG. 2, FIG. 3 and FIG. 9.

In more detail, the ROADM 102a provides optical drop capability and comprises an optical circulator 114 connected to selectable fiber Bragg gratings 116. In operation, a wavelength division multiplexed (WDM) optical signal is introduced at input port 118 of the optical circulator 114, which directs the optical signal to a first port 120 of the selectable fiber Bragg grating 116. The selectable fiber Bragg gratings 116 are controlled at 122 to reflect a selected wavelength of the optical signal back through the first port 120 to the circulator 114 which directs this reflected wavelength to a "drop" port 124 of the circulator 114. The portion of the WDM optical signal, which is not reflected at 122, is passed through the selectable fiber Bragg gratings 116 to a second port 126. Note that the selectable fiber Bragg gratings 116 can be controlled to reflect multiple wavelengths simultaneously.

The combination of the ROADM 102a and the band-modulo demultiplexer 26 allows a variety of optical signals having distinct wavelengths to be presented at outputs 128 to the pool of wavelength conversion resources 106. Each the wavelength conversion resource of the pool of wavelength conversion resources 106 has a broadband receiver 110 to convert the optical signal to an electrical signal which is subsequently converted back to an optical signal by a tunable narrow-band transmitter 112. The resulting converted signals are then combined by a band-modulo multiplexer 74. In other embodiments, other suitable types of optical combiners or multiplexers could be used in place of the band-modulo multiplexer 74.

This embodiment permits a generic pool of wavelength conversion resources to be flexibly deployed and to be assigned dynamically to translate optical signals from one wavelength to another, to resolve color-blocking issues between two optical rings.

The embodiment of FIG. 11 includes optional ROADMS 102c and 102d to also provide an optical-to-optical (OOO) connection between "Ring 1" 103a and "Ring 2" 103b. Here, the drop port 134 of ROADM 102c is connected to add-port 136 of ROADM 102d. This allows selected optical signals (for example, inter-ring express bands) to be routed from "Ring 1" 103a to "Ring 2" 103b.

The embodiment of FIG. 11 shows only a half duplex configuration, that is, directing signals from "Ring 1" to "Ring 2". A bi-directional implementation adding the functionality of directing signals from "Ring 2" to "Ring 1" would be a straightforward extension of this embodiment.

In another embodiment of the present invention, a photonic cross-connect is interposed between the band-modulo demultiplexer and the wavelength conversion resource and between the conversion resource and the optical combiner.

Figure 12:
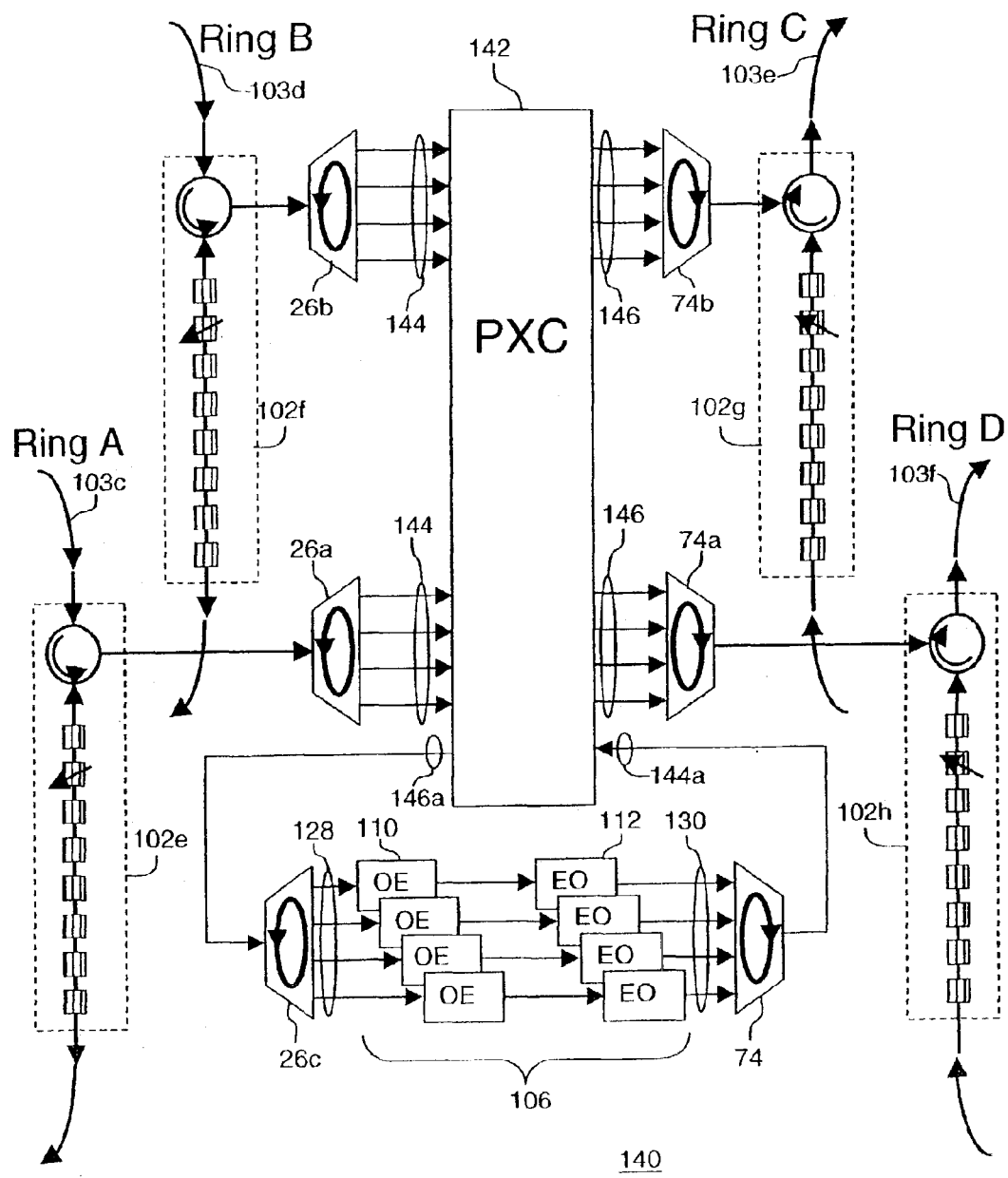
FIG. 12 is a block diagram of an optical interconnect according to another embodiment of the invention.

Referring now to FIG. 12, shown is a block diagram of an optical interconnect system (generally indicated by 140) according to an embodiment of the present invention. A photonic cross-connect (PXC) 142 is used to allow sharing of a pool of wavelength conversion resources 106 among a plurality of optical interconnects.

ROADM 102e selects a subset of the wavelengths of the optical signal on "Ring A" 103c which is presented to band-modulo demultiplexer 26a. The outputs of band-modulo demultiplexer 26a are separate signals which are presented to inputs 144 of a photonic cross-connect 142. Similarly, ROADM 102f selects a subset of the wavelengths of the optical signal on "Ring B" 103d which is presented to band-modulo demultiplexer 26b the outputs of which are presented to other inputs 144 of the photonic cross-connect 142.

The outputs 146 of the photonic cross-connect 142 are presented to multiplexer 74b for delivery to "Ring C" 103e via ROADM 102g, and to multiplexer 74a for delivery to "Ring D" 103f via ROADM 102h.

The photonic cross-connect 142 also has an output 146a to a band-modulo demultiplexer 26c, the outputs 128 of which are connected to the inputs of a pool of wavelength conversion resources 106. The outputs 130 of the wavelength conversion resources 106 are presented to an optical combiner (band-modulo multiplexer 74) the output of which is presented to an input 144a of the photonic cross-connect 142.

Thus, signals which require wavelength conversion before being connected from one ring to another ring, can be routed by the photonic cross-connect 142 to a wavelength conversion resource before being routed to the other ring. Optical signals which don't require wavelength conversion can be routed through the photonic cross-connect 142 and directly to another ring.

In one embodiment, band-modulo demultiplexer 26a partially demultiplexes the subset of signals from ROADM 102e and band-modulo demultiplexer 26c further multiplexes the optical signals to signals having single wavelengths.

In another embodiment, band-modulo demultiplexer 26a is not used and the required demultiplexing is performed by band-modulo demultiplexer 26c.

In yet another embodiment, band-modulo demultiplexer 26c is not used and the required demultiplexing is performed by band-modulo demultiplexer 26a.

Similarly, various embodiments of the present invention use multiplexer 74 and or multiplexer 74a.

Figure 13:
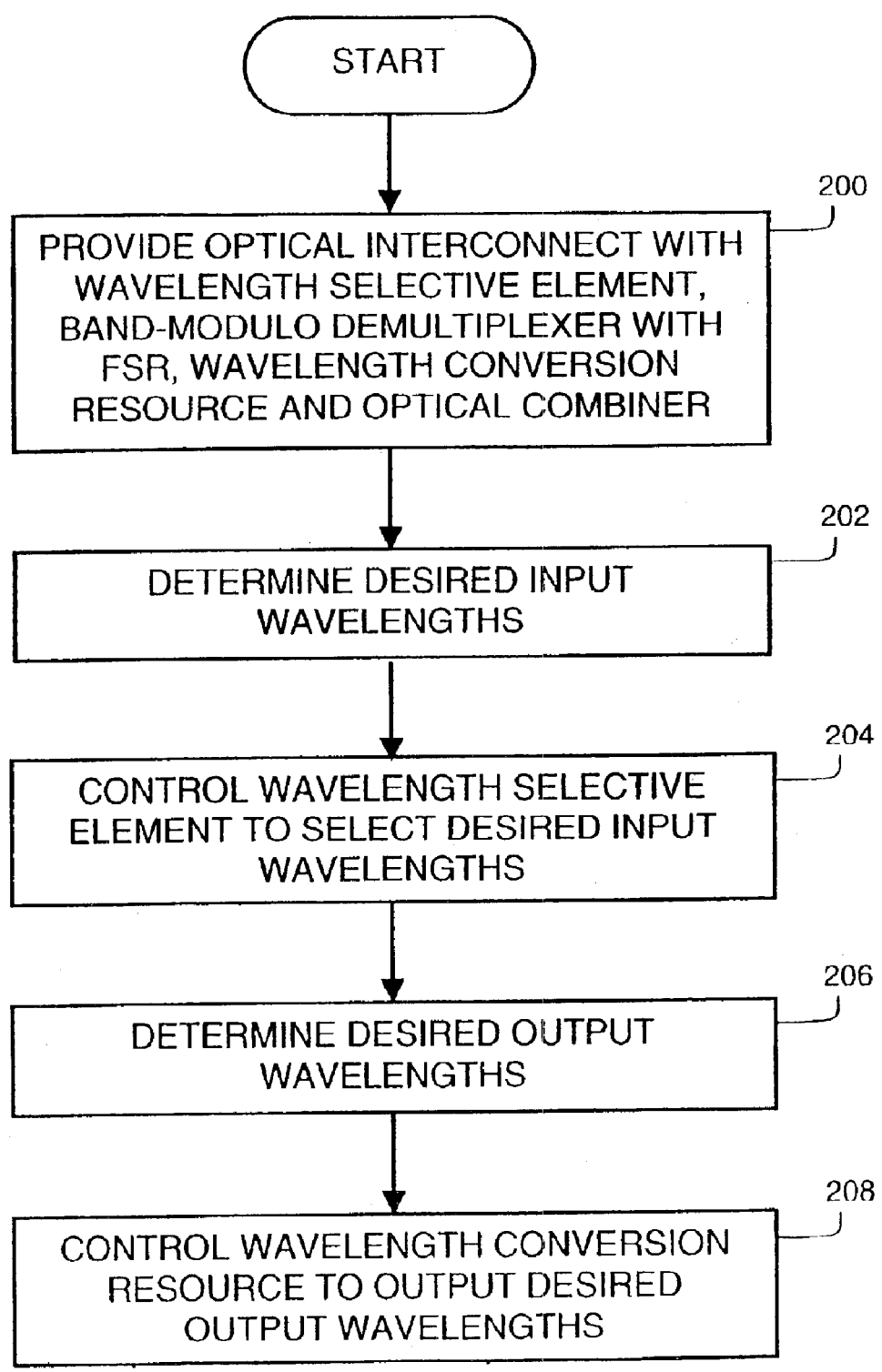
FIG. 13 is flowchart of a method of wavelength management according to another embodiment of the invention.

Still another embodiment of the present invention provides a method of wavelength management. Referring to FIG. 13, the method involves first (at step 200) providing an optical interconnect such as previously described with respect to FIG. 11. Then at step 202, the desired input wavelengths are determined. Next, at step 204 the wavelength selective element is controlled to select the desired input wavelengths. (With respect to the embodiment of FIG. 11, the fiber Bragg gratings 116 are controlled to select the one or more input wavelengths).

At step 206, the desired output wavelengths are determined. This is usually part of network planning or management and is done to overcome color blocking between optical network rings. At step 208 the wavelength conversion resource is controlled to generate the desired output wavelengths so that each selected input wavelength is translated to a respective desired output wavelength.

Numerous modifications and variations of the present invention are possible in light of the above teachings. It is therefore to be understood that within the scope of the appended claims, the invention may be practised otherwise than as specifically described herein.

We claim:

1. An optical interconnect adapted to direct a first subset of an input optical signal from a first optical fiber to a second optical fiber, the input optical signal containing a plurality of wavelengths, the optical interconnect comprising:
    a wavelength selective element adapted to act upon the input optical signal to produce an intermediate optical output signal containing the first subset of the plurality of wavelengths;
    a band-modulo demultiplexer having a free spectral range, the band-modulo demultiplexer being adapted to receive the intermediate optical output signal of the wavelength selective element, the band-modulo demultiplexer being adapted to provide one or more optical output signals; and
    a wavelength conversion resource adapted to convert the one or more optical output signals of the band-modulo demultiplexer to respective different wavelengths.

2. An optical interconnect adapted to direct a first subset of an input optical signal from a first optical fiber to a second optical fiber, the input optical signal containing a plurality of wavelengths, the optical interconnect comprising:
    a wavelength selective element adapted to act upon the input optical signal to produce an intermediate optical output signal containing the first subset of the plurality of wavelengths;
    a band-modulo demultiplexer having a free spectral range, the band-modulo demultiplexer being adapted to receive the intermediate optical output signal of the wavelength selective element, the band-modulo demultiplexer being adapted to provide one or more optical output signals;
    a wavelength conversion resource adapted to convert the one or more optical output signals of the band-modulo demultiplexer to respective different wavelengths; and
    an optical combiner for combining the converted optical output signals into a single optical signal on the second optical fiber.

3. The optical interconnect as claimed in claim 2, wherein the wavelength conversion resource comprises one or more optical wavelength converters, each converter adapted to convert a respective one of the one or more optical output signals to a corresponding converted optical output signal having a different wavelength.

4. The optical interconnect as claimed in claim 3, wherein each optical wavelength converter comprises an optical-to-electrical-to-optical wavelength converter.

5. The optical interconnect as claimed in claim 4, wherein each optical wavelength converter comprises a broadband optical receiver to receive the respective one of the one or more optical output signals, the broadband optical receiver adapted to produce a corresponding electrical signal.

6. The optical interconnect as claimed in claim 5, wherein each optical wavelength converter further comprises a tuneable narrow-band optical transmitter adapted to receive the electrical signal and to generate the corresponding converted optical output signal.

7. The optical interconnect as claimed in claim 2, further comprising fully optical interconnect resources to direct a second subset of the input optical signal from the first optical fiber to the second optical fiber.

8. The optical interconnect as claimed in claim 2, wherein the optical combiner comprises a band filter.

9. The optical interconnect as claimed in claim 2, wherein the optical combiner comprises a band-modulo optical multiplexer.

10. The optical interconnect as claimed in claim 2, wherein the optical combiner comprises an optical add/drop multiplexer.

11. The optical interconnect as claimed in claim 2, wherein the selected subset consists of an arbitrary subset of wavelengths from the plurality of wavelengths.

12. The optical interconnect as claimed in claim 11, wherein the arbitrary subset of wavelengths is subject to a constraint that no two wavelengths in the arbitrary subset are separated by a multiple of the free spectral range.

13. The optical interconnect as claimed in claim 2, wherein the wavelength selective element is adapted to select a contiguous set of wavelengths.

14. The optical interconnect as claimed in claim 2, wherein the wavelength selective element is a bandpass filter having a passband.

15. The optical interconnect as claimed in claim 2, wherein the wavelength selective element comprises a bank of components that are individually selectable, each component being adapted to select a respective contiguous set of wavelengths.

16. The optical interconnect as claimed in claim 15, wherein each component is a bandpass filter having a passband.

17. The optical interconnect as claimed in claim 2, wherein the first optical fiber is part of a first optical communication ring and the second optical fiber is part of a second optical communication ring.

18. An optical interconnect system comprising at least a first and a second optical interconnect according to claim 2 wherein the first optical fiber of the first optical interconnect is the second optical fiber of the second optical interconnect and the first optical fiber of the second optical interconnect is the second optical fiber of the first optical interconnect.

19. An optical interconnect according to claim 2 wherein a photonic cross-connect is interposed between the band-modulo demultiplexer and the wavelength conversion resource and between the wavelength conversion resource and the optical combiner.

20. An optical interconnect system comprising a plurality of optical interconnects according to claim 19 wherein the photonic cross-connect and the wavelength conversion resource are shared among the plurality of optical interconnects.

21. An optical interconnect system according to claim 20, having at least a first and a second optical interconnect, wherein the first optical fiber of the first optical interconnect is the second optical fiber of the second optical interconnect and the first optical fiber of the second optical interconnect is the second optical fiber of the first optical interconnect.

22. A method of wavelength management in an optical network comprising steps of:

providing an optical interconnect adapted to direct a first subset of an input optical signal from a first optical fiber to a second optical fiber, the input optical signal containing a plurality of wavelengths, the optical interconnect comprising a wavelength selective element adapted to act upon the input optical signal to produce an intermediate optical output signal containing the first subset of the plurality of wavelengths, a band-modulo demultiplexer having a free spectral range, the band-modulo demultiplexer being adapted to receive the intermediate optical output signal of the wavelength selective element, the band-modulo demultiplexer being adapted to provide one or more optical output signals, a wavelength conversion resource adapted to convert the one or more optical output signals of the band-modulo demultiplexer to respective different wavelengths and an optical combiner for combining the converted optical output signals into a single optical signal on the second optical fiber;

determining desired input wavelengths to be directed from the first optical fiber to the second optical fiber;

controlling the wavelength selective element to select the desired input wavelengths;

determining desired respective different output wavelengths to which to convert the desired input wavelengths; and controlling the wavelength conversion resource to output the desired respective different wavelengths.

* * * * *